United States Patent Office 3,462,423
Patented Aug. 19, 1969

3,462,423
CYANO-DERIVATIVES OF STEROIDS
Alberto Consonni, Bianca Patelli, and Roberto Sciaky, Milan, Italy, assignors to Societa Farmaceutici Italia, Milan, Italy, a corporation of Italy
No Drawing. Filed Dec. 28, 1966, Ser. No. 605,223
Claims priority, application Italy, Dec. 29, 1965, 28,893/65
Int. Cl. C07c *169/34, 169/36, 169/26*
U.S. Cl. 260—239.55   4 Claims

ABSTRACT OF THE DISCLOSURE

Disclosed are 6-cyano-steroids having the formula:

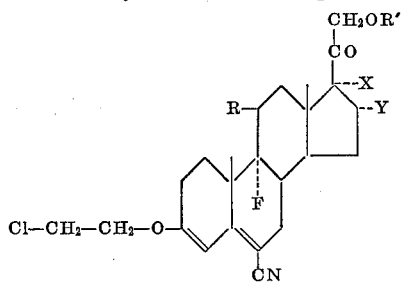

wherein
R is selected from the group consisting of O and $(\alpha H)\beta OR'$;
R' is selected from the group consisting of hydrogen and the acyl of a mono- or di-carboxylic acid having to and including 9 carbon atoms;
X is OH;
Y is selected from the group consisting of H and OH or X and Y are together the group

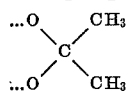

A process of preparing these compounds is also disclosed. The compounds display therapeutic utility.

---

Our present invention relates to a process for introducing a CN group into the 6-position of 3-alkoxy-6-cyano-3,5-pregnadienes and to the new class of 3-alkoxy-6-cyano-3,5-pregnadienes prepared thereby, which are useful in therapy.

The invention has as an object the 3-alkoxy-6-cyano-3,5-pregnadienes and a process for preparing them from the corresponding 6-formyl-derivatives.

The new 6-cyano-steroids of the invention have the formula:

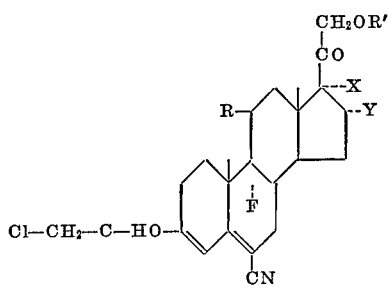

wherein
R is selected from the group consisting of O and $(\alpha H)\beta OR'$;
R' is selected from the group consisting of hydrogen and the acyl of a mono- or di-carboxylic acid having to and including 9 carbon atoms;
X is OH;
Y is selected from the group consisting of H and OH or X and Y are together the group

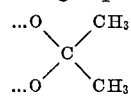

The process of the invention is a simple method and gives high yields. The alkoxy group in 3-position is an alkyl radical which may be substituted with a halogen or a hydroxy group. A steroid of the class of 3-alkoxy-6-formyl-3,5-pregnadienes is reacted with O,N-bis(trifluoroacetyl)hydroxylamine, known in literature, in an organic solvent, such as benzene or toluene, in the presence of a tertiary amine, such as pyridine or triethylamine. The starting 3-alkoxy-6-formyl - 3,5 - pregnadienes are known in literature (British Patent No. 929,983). The 3-ω-haloalkoxy-derivatives are described in Belgian Patents 646,-036 and 666, 853, which correspond to U.S. application Ser. Nos. 356,642, now abandoned, and 471,450, now U.S. Patent No. 3,314,945, respectively. The reaction is carried out in the warm, preferably at the boiling temperature of the solvent used, for a period of from 10 to 30 hours. The reaction may also be carried out at room temperature, but in this case, the reaction time is longer. When the reaction is over, the product obtained may be operated by known extraction techniques and purified by recrystallization from suitable solvents or by chromatography over adsorbent substances and subsequent elution with solvents.

Typical compounds of the invention are:

3-(2'-chlorethoxy)-6-cyano-9α-fluoro-3,5-pregnadiene-17-α-21-diol-11,20-dione-21-acetate;
3-(2'-chloroethoxy)-6-cyano-9α-fluoro-3,5-pregnadiene-11β,16α,17α,21-tetrol-20-one-21-acetate-16α,17α-acetonide; and
3-(2'-chloroethoxy)-6-cyano-9α-fluoro-3,5-pregnadiene-11β,17α,21-triol-20-one-21-acetate.

Other typical esters are propionate, butyrate, hemisuccinate, caproate, enanthate, benzoate, trimethylacetate, phenoxy-acetate, cyclopentylpropionate and phenylpropionate. The corresponding 21-hydroxy-derivatives may be obtained by hydrolysis from the 21-acyloxy-derivatives.

The new 6-cyano-derivatives of the invention display a good antiinflammatory, antirheumatic and antiallergic activity without showing undesired side-effects, and are used in human and veterinary therapy. Clinical indications include: skin diseases, eczema, psoriasis, urticaria, allergic syndromes, rheumatic arthritis, articular rheumatism, uratic arthritis, nephrosic syndromes, conjunctivitis, ophthalmia, synovitis, and shock states. Therapeutic applications in veterinary field are: articular rheumatism, allergic skin diseases, eczema, urticaria, itchings in general, shock states, synovitis, tenosynovitis, asthmatic and acute bronchitis, conjunctivitis, keratitis. The products of the present invention may be administered by parenteral, oral or topical route. Therapeutic compositions comprise one of the products of the present invention with a certain quantity of a pharmaceutically acceptable liquid or solid vehicle. The compositions may be prepared as sterilized solutions, tablets, powders, ointments, ointment solutions or emulsions. Excipients may be employed, among which the most suitable are starch, lactose, talc, magnesium stearate and analogues thereof.

The antiinflammatory activity of the products of the invention has been determined according to the method described by A. Robert et al. (Acta Endocrinol. 25, 1957, pp. 105–110) on Albinus rats. The products have been locally administered (Selye pouch) on groups of 8–10 animals, either once at the beginning of the test or daily. The following table shows the values of the effective dose. ($ED_{50}$), expressed in µg., i.e., the dose which inhibits the 50% of the inflammatory exudate, of some new compounds of the invention in comparison to dexamethasone. The values of $ED_{50}$ have been calculated from the diagram of the percent inhibitions of the exudate formation at various doses at logarithmic interval in comparison with the controls.

TABLE

| Compound | $ED_{50}$ (µg.) | |
| --- | --- | --- |
| | One application | Daily application |
| 3-(2'-chloroethoxy)-6-cyano-9α-fluoro-3,5-pregnadiene-11β,16α,17α, 21-tetrol-20-one-21-acetate-16α,17α-acetonide | 10.7 | 0.34 |
| 3-(2'-chloroethoxy)-6-cyano-9α-fluoro-3,5-pregnadiene-17α,21-diol-11,20-dione-21-acetate | 17.2 | 1.09 |
| Dexamethasone | 150 | 1.60 |

The following examples serve further to illustrate the invention, but not to limit it.

EXAMPLE 1

3-(2'-chloroethoxy)-6-cyano-9α-fluoro-3,5-pregnadiene-17α,21-diol-11,20-dione-21-acetate 1 g. of O,N-bis(trifluoroacetyl)hydroxylamine is dissolved in 50 cc. of anhydrous benzene and 1.5 cc. of anhydrous pyridine. To the resulting solution, 1.5 g. of 3-(2'-chloroethoxy)-6-formyl-9α - fluoro - 3,5 - pregnadiene-17α,21-diol-11,20-dione-21-acetate are added. The solution is refluxed overnight, cooled, poured into a separating funnel, diluted with ethyl acetate and washed with water. The aqueous layer is removed, the mixture is dried over anhydrous sodium sulfate and the solvent is distilled off in vacuo. The residue is chromatographed over 30 g. of Florisil (registered trademark), an activated magnesium silicate. From the fractions eluted with benzene/ethyl ether (95:5), 3-(2'-chloroethoxy)-6-cyano-9α-fluoro-3,5-pregnadiene-17α,21-diol-11,20-dione - 21 - acetate is isolated, which after crystallization from acetone/petroleum ether, melts at 198–200° C.;

$\lambda_{max.}^{C_2H_5OH}$ 283 mµ

EXAMPLE 2

3-(2'-chloroethoxy)-6-cyano-9α-fluoro-3,5 - pregnadiene-11β,16α,17α,21-tetrol - 20 - one - 21 - acetate - 16α,17α-acetonide 1 g. of 3-(2'-chloroethoxy)-6-formyl-9α - fluoro - 3,5-pregnadiene-11β,16α,17α,21-tetrol-20 - one - 21 - acetate-16α,17α-acetonide is refluxed for 1 hour with 20 cc. of anhydrous benzene, 0.5 cc. of pyridine and 0.800 g. of O,N-bis(trifluoroacetyl)hydroxylamine. The mixture is cooled, poured into a separating funnel and diluted with benzene. It is then washed with water, the aqueous layer is removed, the mixture is dried over anhydrous sodium sulfate and the solvent is distilled off in vacuo. A residue of 1 g. obtained is then chromatographed over 25 g. of Florisil (registered trademark). From the fractions eluted with benzene/diethyl ether (3:1) the product melting at 231–215° C. is crystallized:

$\lambda_{max.}^{C_2H_5OH}$ 281 mµ; ε=17.250

We claim:

1. Compounds of the formula:

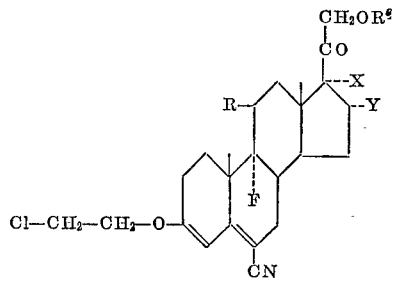

wherein

R is selected from the group consisting of O and (αH)βOR';

R' is selected from the group consisting of hydrogen and an acyl of mono- and di-carboxylic acids having up to 9 carbon atoms;

X is OH;

Y is selected from the group consisting of H and OH and X and Y together may form the group

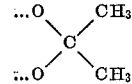

2. The compound of claim 1, which is 3-(2'-chloroethoxy)-6-cyano-9α-fluoro-3,5-pregnadiene-17α,21 - diol-11,20-dione-21-acetate.

3. The compound of claim 1, which is 3-(2'-chloroethoxy) - 6 - cyano - 9α - fluoro - 3,5 - pregnadiene-11β,16α,17α,21- tetrol -20 - one - 21 - acetate - 16α,17α-acetonide.

4. The compounds of claim 1, which is 3-(2'-chloroethoxy - 6 - cyano - 9α - fluoro - 3,5 - pregnadiene-11β,17α,21-triol-20-one-21-acetate.

References Cited

UNITED STATES PATENTS 3,311,617    3/1967    Petrow et al. _____ 260—239.55

OTHER REFERENCES

Pomeroy et al.: Journ. Amer. Chem. Soc., vol. 81, December 1959, pp. 6340–1.

LEWIS GOTTS, Primary Examiner

E. G. LOVE, Assistant Examiner

U.S. Cl. X.R.

260—397.45, 999